(12) United States Patent
Chen

(10) Patent No.: US 11,184,212 B2
(45) Date of Patent: Nov. 23, 2021

(54) DYNAMIC CONFIGURATION METHOD, TERMINAL DEVICE, NETWORK DEVICE AND COMPUTER STORAGE MEDIUM

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/846,080

(22) Filed: Apr. 10, 2020

(65) Prior Publication Data
US 2020/0267043 A1 Aug. 20, 2020

Related U.S. Application Data

(63) Continuation of application No. PCT/CN2018/087924, filed on May 22, 2018.

(30) Foreign Application Priority Data

Feb. 23, 2018 (WO) ............... PCT/CN2018/077062

(51) Int. Cl.
*H04L 27/36* (2006.01)
*H04W 72/12* (2009.01)

(52) U.S. Cl.
CPC ......... *H04L 27/36* (2013.01); *H04W 72/1289* (2013.01)

(58) Field of Classification Search
CPC ..... H04L 27/36; H04L 1/0003; H04L 1/0026; H04L 5/0057; H04W 72/1289; H04W 72/085; H04W 72/042
See application file for complete search history.

(56) References Cited

U.S. PATENT DOCUMENTS 8,718,661 B2   5/2014  Abu-Alhiga
9,160,485 B2  10/2015  Kim et al.
(Continued)

FOREIGN PATENT DOCUMENTS

CN   101686214 A   3/2010
CN   103944855 A   7/2014
(Continued)

OTHER PUBLICATIONS

International Search Report in the international application No. PCT/CN2018/077062, dated Aug. 31, 2018.
(Continued)

*Primary Examiner* — Kibrom T Hailu
(74) *Attorney, Agent, or Firm* — Perkins Coie LLP

(57) ABSTRACT

Disclosed are a dynamic configuration method, a terminal device, a network device and a computer storage medium. The method comprises: a terminal device receiving configuration information of at least two modulation and coding scheme (MCS) tables, wherein the configuration information is used for determining the at least two MCS tables; the terminal device receiving scheduling information sent by a network side; and the terminal device determining a target MCS table from the at least two MCS tables based on the scheduling information and the correlation between scheduling information and an MCS tables.

20 Claims, 2 Drawing Sheets

(56) References Cited

U.S. PATENT DOCUMENTS

| | | | |
|---|---|---|---|
| 9,338,691 | B2 | 5/2016 | Kim et al. |
| 9,485,764 | B2 | 11/2016 | Kim et al. |
| 9,794,022 | B2 | 10/2017 | Xu et al. |
| 10,567,108 | B2* | 2/2020 | Nammi ................. H04L 1/0016 |
| 2010/0279628 | A1 | 11/2010 | Love |
| 2011/0069637 | A1 | 3/2011 | Liu |
| 2011/0143799 | A1 | 6/2011 | Abu-Alhiga |
| 2014/0153484 | A1 | 6/2014 | Kim et al. |
| 2014/0192732 | A1* | 7/2014 | Chen ..................... H04L 1/0003 370/329 |
| 2015/0312071 | A1* | 10/2015 | Chen .................. H04L 27/0008 370/329 |
| 2015/0372784 | A1 | 12/2015 | Xu et al. |
| 2016/0014637 | A1 | 1/2016 | Kim et al. |
| 2016/0036618 | A1* | 2/2016 | Einhaus ............ H04W 72/1263 370/329 |
| 2016/0100390 | A1* | 4/2016 | Kuo ...................... H04L 1/0009 370/329 |
| 2016/0219600 | A1* | 7/2016 | Li ......................... H04L 1/0016 |
| 2016/0234812 | A1 | 8/2016 | Kim et al. |
| 2016/0249244 | A1 | 8/2016 | Xia et al. |
| 2016/0261393 | A1* | 9/2016 | Chen ..................... H04L 1/0003 |
| 2016/0323855 | A1* | 11/2016 | Nakamura ........... H04L 1/0016 |
| 2016/0323912 | A1* | 11/2016 | Nakamura ........... H04L 5/0053 |
| 2016/0353440 | A1* | 12/2016 | Lee .................. H04W 72/0453 |
| 2017/0223728 | A1* | 8/2017 | Luo et al. ............. H04L 1/0003 370/329 |
| 2017/0366298 | A1 | 12/2017 | Xu et al. |
| 2018/0035369 | A1* | 2/2018 | Hahn ................. H04W 72/12 |
| 2019/0215095 | A1* | 7/2019 | Park .................... H04W 72/042 |
| 2019/0222462 | A1* | 7/2019 | Nammi ................. H04L 1/0026 |
| 2021/0045145 | A1* | 2/2021 | Yoshimura ............ H04W 76/11 |

FOREIGN PATENT DOCUMENTS

| | | | |
|---|---|---|---|
| CN | 105846983 | A | 8/2016 |
| CN | 106992847 | A | 7/2017 |
| EP | 3054613 | A1 | 8/2016 |
| WO | 2017195702 | A1 | 11/2017 |

OTHER PUBLICATIONS

International Search Report in the international application No. PCT/CN2018/087924, dated Oct. 29, 2018.
English translation of the Written Opinion of the International Search Authority in the international application No. PCT/CN2018/077062, dated Aug. 31, 2018.
English translation of the Written Opinion of the International Search Authority in the international application No. PCT/CN2018/087924, dated Oct. 29, 2018.
"3rd Generation Partnership Project; Technical Specification Group Radio Access Network; NR; Physical layer procedures for data (Release 15)", 3GPP TS 38.214 V15.1.0 (Mar. 2018), http://www.3gpp.org.
Mediatek Inc: "MCS and CQI Tables design for URLLC", 3GPP Draft; R1 -1801676 MCS and CQI Tables Design for URLLC Mediatek, RD Generation Partnership Project (3GPP), Mobile Competence Centre: 650, Route Des Lucioles: F-06921 Sophia-Antipolis Cedex; FR, vol. RAN WG1, No. Athens, Greece; Feb. 26, 2018-Mar. 2, 2018 Feb. 17, 2018 (Feb. 17, 2018), XP051397677 Retrieved from the Internet: URL: http://www.3gpp. org/tp/tsg%5Fran/WG1%5FRL1/TSGR1 %5F92/Docs/ [retrieved on Feb. 17, 2018].
Intel Corporation: "CQIMCS/TBS Tables for 256QAM and Relevant Signaling", 3GPP Draft: R1-140118 INTEL-256QAM Tables Signaling-Copy, 3rd Generation Partnership Project (3GPP), Mobile Competence Centre 650, Route Des Lucioles; F-06921 Sophia-Antipolis Cedex; France, vol. RAN WG1, No. Prague, Czech Republic; Feb. 10, 2014-Feb. 14, 2014 Feb. 9, 2014 (Feb. 9, 2014), XP050735682 Retrieved from the Internet: URL: http://www.3gpp.org/ftp/Meetings_3GPP SYNC/RAN/RAN1/Docs/ [retrieved on Feb. 9, 2014].
Huawei et al.: "MCS/CQI design for URLLC transmission", 3GPP Draft: R1-1800059, 3rd Generation Partnership Project (3GPP), Mobile Competence Centre; 650, Route Des Lucioles; F-06921 Sophia-Antipolis Cedex; France, Jan. 13, 2018 (Jan. 13, 2018), pp. 1-7, XP051384562, Retrieved from the Internet: URL: http://www.3gpp.org/ftp/tsg%5Fran/WG1%5FRL1/TSGR1 %5FAH/NR%5FAH%5F1801/Docs/.
Supplementary European Search Report in the European application No. 18906809.1, dated Nov. 12, 2020.
First Office Action of the Chinese application No. 202010269262.3, dated Jul. 5, 2021. 13 pages with English translation.
First Office Action of the European application No. 18906809.1, dated Jun. 28, 2021. 5 pages.
Office Action of the Indian application No. 202017025603, dated Aug. 31, 2021. 6 pages with English translation.
Second Office Action of the Chinese application No. 202010269262.3, dated Sep. 23, 2021. 10 pages with English translation.

* cited by examiner

DYNAMIC CONFIGURATION METHOD, TERMINAL DEVICE, NETWORK DEVICE AND COMPUTER STORAGE MEDIUM

CROSS REFERENCE TO RELATED APPLICATIONS

This is a continuation of International Patent Application No. PCT/CN2018/087924 filed on May 22, 2018, which claims priority to Chinese Patent Application No. PCT/CN2018/077062 filed on Feb. 23, 2018. The disclosures of these applications are hereby incorporated by reference in their entirety.

TECHNICAL FIELD

The disclosure relates to the technical field of information processing, and particularly to a dynamic configuration method, a terminal device, a network device and a computer storage medium.

BACKGROUND

At present, a 5th-Generation (5G) New Radio (NR) system supports Enhance Mobile Broadband (eMBB) and Ultra Reliable Low Latency Communication (URLLC) services. The two services have different reliability requirements, and thus Modulation and Coding Scheme (MCS) configurations for them are usually different, and ranges of the MCS configurations are also different. Some companies suggest to configure MCS tables for URLLC and eMBB through high-layer signaling. However, URLLC and eMBB services are dynamically triggered, and such a working mechanism cannot meet a service transmission requirement.

SUMMARY

For solving the above technical problem, embodiments of the disclosure provide a dynamic configuration method, a terminal device, a network device and a computer storage medium.

The embodiments of the disclosure provide a dynamic configuration method, which may be applied to a terminal device and include the following operations.

The terminal device receives configuration information of at least two MCS tables, the configuration information being used for determining the at least two MCS tables.

The terminal device receives scheduling information from a network side.

The terminal device determines a target MCS table from the at least two MCS tables based on the scheduling information and a correspondence between scheduling information and at least two MCS tables.

The embodiments of the disclosure provide a dynamic configuration method, which may be applied to a network device and include the following operations.

Configuration information of at least two MCS tables is sent to a terminal device, the configuration information being used for determining the at least two MCS tables.

Scheduling information is sent to the terminal device, the scheduling information forming a correspondence with the at least two MCS tables.

The embodiments of the disclosure provide a terminal device, which may include a first communication unit and a first processing unit.

The first communication unit is configured to receive configuration information of at least two MCS tables, the configuration information being used for determining the at least two MCS tables, and receive scheduling information from a network side.

The first processing unit is configured to determine a target MCS table from the at least two MCS tables based on the scheduling information and a correspondence between scheduling information and at least two MCS tables.

The embodiments of the disclosure provide a network device, which may include a second communication unit.

The second communication unit is configured to send configuration information of at least two MCS tables to a terminal device, the configuration information being used for determining the at least two MCS tables, and send scheduling information to the terminal device, the scheduling information forming a correspondence with the at least two MCS tables.

The embodiments of the disclosure provide a terminal device, which may include a processor; and a memory configured to store computer programs capable of running in the processor.

The processor may be configured to run the computer programs to execute the steps of the abovementioned method.

The embodiments of the disclosure provide a network device, which may include a processor; and a memory configured to store computer programs capable of running in the processor.

The processor may be configured to run the computer programs to execute the steps of the abovementioned method.

The embodiments of the disclosure provide a computer storage medium having stored thereon computer-executable instructions that, when being executed, implement the steps of the abovementioned methods.

According to the technical solutions of the embodiments of the disclosure, the configuration information of the at least two MCS tables can be acquired in advance, then a target MCS table is selected from the at least two MCS tables according to the scheduling information, and the target MCS table is further used for subsequent processing. As a result, MCS tables can be dynamically configured for adaptation to dynamic scheduling of URLLC and eMBB services. Moreover, through adoption of an implicit indication manner, a physical-layer signaling overhead is reduced, and reliability of physical-layer signaling is improved.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Embodiment 1

Figure 1:
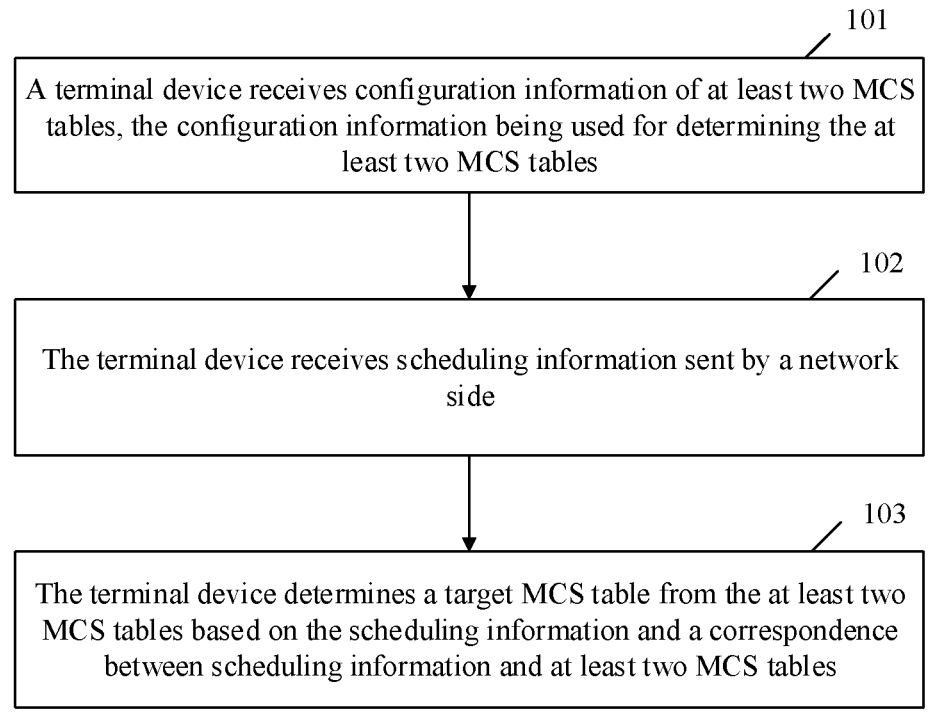
FIG. 1 is a first flowchart of a dynamic configuration method according to an embodiment of the disclosure.

The embodiment of the disclosure provides a dynamic configuration method, which is applied to a terminal device and, as shown in FIG. 1, includes the following operations.

In 101, the terminal device receives configuration information of at least two MCS tables, the configuration information being used for determining the at least two MCS tables.

In 102, the terminal device receives scheduling information sent by a network side.

In 103, the terminal device determines a target MCS table from the at least two MCS tables based on the scheduling information and a correspondence between scheduling information and at least two MCS tables.

That is, in the solution provided in the embodiment, the terminal receives the scheduling information, and then the terminal determines the MCS table based on the scheduling information.

Moreover, the terminal device receives the configuration information of the at least two MCS tables from the network side.

The at least two MCS tables at least include a first MCS table and a second MCS table.

The first MCS table is part of the second MCS table, and/or, the first MCS table is formed by elements corresponding to odd or even index values in the second MCS table.

The first MCS table being part of the second MCS table indicates that: the first MCS table is a former half of the second MCS table.

It may also be understood that the first MCS table may also be a latter half of the second MCS table and may also be a middle part of the second MCS table, which will not be exhaustive in the embodiment. Moreover, the former half of the second MCS table may be half of all entries contained in the second MCS table, specifically a former half of the entries. Correspondingly, the latter half and the middle part of the second MSC table are designated in the same manner and will not be elaborated herein.

The scheduling information includes at least one of the following types: a Control Resource Set (CORESET); a search space set; a search space; a time-domain resource indication type; a time-domain resource length; MCS table indication information; a Downlink Control Information (DCI) format; an aggregation level; a service indicator; a Cyclic Redundancy Check (CRC); or a Radio Network Temporary Identity (RNTI).

The control resource set may be a CORESET. The search space set may be a search space set. The search space may be a search space. The time-domain resource indication type may be, for example, Type A or Type B. The time-domain resource length may be a short Time Transmission Interval (TTI) or a long TTI. The scheduling information may further include MCS table indication information.

The method further includes the following operation.

The correspondence between the scheduling information and the at least two MCS tables is determined based on a protocol, or, the correspondence between the scheduling information and the at least two MCS tables is determined based on a high-layer configuration. Specifically, the relationship between the MCS tables and the above types of the scheduling information are predetermined through the protocol or configured by a high layer.

The method further includes that: a corresponding MCS table is configured for each scheduling information in each type of the scheduling information.

Correspondingly, the operation that the target MCS table is determined based on the correspondence between the scheduling information and the MCS tables includes the following actions.

A scheduling information type corresponding to the received scheduling information is determined.

The target MCS table is determined from the at least two MCS tables based on the scheduling information type corresponding to the scheduling information and a correspondence between the scheduling information type of the scheduling information and an MCS table.

The type of the scheduling information may specifically include one of the following types: the CORESET; the search space set; the search space; the time-domain resource indication type; the time-domain resource length; or the MCS table indication information. Moreover, each type of the scheduling information may include different scheduling information, such as, a CORESERT A, a CORESET B; or a search space set A, a search space set B, which may all be understood as different scheduling information for different types of scheduling information and may generally be understood as different types of scheduling information.

A correspondence between different types of scheduling information and MCS tables will be described below in the following manners.

First manner: the MCS table is determined based on CORESET configuration.

MCS tables corresponding to scheduling information for different CORESETs may be determined through the protocol or the high-layer configuration. The scheduling information for different CORESETs may be understood as different types of scheduling information. For example, scheduling information for a CORESET 1 has a correspondence with an MCS table 1, and scheduling information for a CORESET 2 has a correspondence with an MCS table 2.

Descriptions will be made below with an example. The operation in 102 that the terminal device receives the scheduling information sent by the network side may be as follows.

The terminal device receives the scheduling information in the CORESET 1. It may be understood that a scheduling information type corresponding to the scheduling information is the CORESET 1.

The operation in 103 that the terminal device determines the target MCS table from the at least two MCS tables based on the scheduling information and the correspondence between the scheduling information and the MCS tables may include the following action.

The MCS table 1 is determined from the MCS table 1 and the MCS table 2 as the target MCS table based on the scheduling information type, i.e., the CORESET 1 corresponding to the scheduling information and the correspondence between the scheduling information for the CORESET 1 and an MCS table.

If the terminal device receives the scheduling information corresponding to the CORESET 2 in operation 102, it may be understood that the scheduling information type corresponding to the scheduling information is the CORESET 2.

Correspondingly, the operation 103 is specifically implemented as follows: the MCS table 2 is determined as the target MCS table based on the scheduling information type, i.e., the CORESET 2, corresponding to the scheduling information and the correspondence between the scheduling information in the CORESET 2 and an MCS table.

In such a manner, a corresponding MCS table may be set in a CORESET, or, a corresponding CORESET type is set in the MCS table by the protocol or the high-layer configuration. The CORESET configuration may be indicated by high-layer signaling or physical-layer signaling, and may also be predetermined through the protocol.

In addition, a CORESET for which no MCS table is configured corresponds to a default MCS table. The default MCS table is predetermined through the protocol or notified through signaling. Typically, a small MCS table or a low-order MCS table is configured for a high-density CORESET.

That is, when the scheduling information is received by the terminal device, in a case that the scheduling information corresponds to the CORESET for which no MCS table is configured, the default MCS table may be used for subsequent processing.

The default MCS table may be one of a plurality of MCS tables. For example, if two tables MCS1 and MCS2 are configured at present, it may be designated by the network side or specified through the protocol that the default MCS table is MCS1 (or MCS2).

It is also to be understood that such a configuration manner may be applied to multiple scenarios subsequently described and will not be subsequently elaborated.

Second manner: the MCS table is determined based on search space set/search space configuration.

In such a manner, the network side determines, through the protocol or the high-layer signaling, MCS tables corresponding to scheduling information for different search space sets/search spaces. The scheduling information for different search space sets/search spaces may be understood as different types of scheduling information. For example, scheduling information for a search space set/search space 1 forms a correspondence with the MCS table 1, and scheduling information for a search space set/search space 2 forms a correspondence with the MCS table 2.

Descriptions will be made below with an example. The operation in 102 that the terminal device receives the scheduling information sent by the network side may be as follows.

The terminal device receives the scheduling information in the search space set/search space 1. It may be understood that the scheduling information type corresponding to the scheduling information is the search space set/search space 1.

The operation in 103 that the terminal device determines the target MCS table from the at least two MCS tables based on the scheduling information and the correspondence between scheduling information and MCS tables may include the following operation.

The MCS table 1 may be determined as the target MCS table based on the scheduling information type, i.e., the search space set/search space 1 corresponding to the scheduling information and the correspondence between the scheduling information for the search space set/search space 1 and the MCS table.

If the terminal device receives the scheduling information corresponding to the search space set/search space 2 in 102, it may be understood that the scheduling information type corresponding to the scheduling information is the search space set/search space 2.

Correspondingly, the operation 103 is specifically implemented as that: the MCS table 2 may be determined as the target MCS table based on the scheduling information type, i.e., the search space set/search space 2, corresponding to the scheduling information and the correspondence between the scheduling information for the search space set/search space 2 and the MCS table.

Typically, a configuration manner may be that: a small MCS table or a low-order MCS table is configured for a high-aggregation-level search space set/search space.

Third manner: the MCS table is determined based on time-domain resource indication type.

MCS tables corresponding to scheduling information for different time-domain resource indication types (for example, a time-domain resource Type A or time-domain resource Type B) are determined through the protocol or the high-layer configuration. The scheduling information for different time-domain resource indication types may be understood as different types of scheduling information. For example, scheduling information corresponding for the time-domain resource Type A has a correspondence with an MCS table 1, and scheduling information for time-domain resource Type B has a correspondence with an MCS table 2.

Descriptions will be made below with an example. The operation in 102 that the terminal device receives the scheduling information sent by the network side may be as follows.

The terminal device receives the scheduling information in the time-domain resource Type A. It may be understood that the scheduling information type corresponding to the scheduling information is the time-domain resource Type A.

The operation in 103 that the terminal device determines the target MCS table from the at least two MCS tables based on the scheduling information and the correspondence between the scheduling information and the MCS table may include the following operation.

The MCS table 1 may be determined as the target MCS table based on the scheduling information type, i.e., time-domain resource Type A corresponding to the scheduling information and the correspondence between the scheduling information for the time-domain resource Type A and the MCS table.

If the terminal receives the scheduling information in the time-domain resource Type B in operation 102, it may be understood that the scheduling information type corresponding to the scheduling information is the time-domain resource Type B.

Correspondingly, the operation 103 is specifically implemented as that: the MCS table 2 may be determined as the target MCS table based on the scheduling information type, i.e., time-domain resource Type B corresponding to the scheduling information and the correspondence between the scheduling information for the time-domain resource Type B and the MCS table.

That is, when the scheduling information is received by the terminal device from the network side and the scheduling information is determined to correspond to the type A, the MCS table 1 is adopted.

Typically, a conventional MCS table is adopted for time-domain resource Type A, and an MCS table covering an ultra-low bit rate or a small MCS table is adopted for the time-domain resource Type B.

Fourth manner: the MCS table is determined based on the time-domain resource length.

MCS tables corresponding to scheduling information for different time-domain resource lengths/time-domain length ranges are determined through the protocol or high-layer configuration. The scheduling information for different time-domain resource lengths/time-domain length ranges may be understood as different types of scheduling information. For example, scheduling information for a time-domain resource length/time-domain length range 1 has a correspondence with an MCS table 1, and scheduling information for a time-domain resource length/time-domain length range 2 has a correspondence with an MCS table 2.

Descriptions will be made below with an example. The operation in 102 that the terminal device receives the scheduling information sent by the network side may be as follows.

The terminal device receives the scheduling information within the time-domain resource length/time-domain length range 1. It may be understood that the scheduling information type corresponding to the scheduling information is the time-domain resource length/time-domain length range 1.

The operation in 103 that the terminal device determines the target MCS table from the at least two MCS tables based on the scheduling information and the correspondence between the scheduling information and MCS tables may include the following operation.

The MCS table 1 corresponding to the scheduling information in the time-domain resource length/time-domain length range 1 is determined as the target MCS table based on the scheduling information type, i.e., the time-domain resource length/time-domain length range 1 corresponding to the scheduling information, and an MCS level is analyzed according to the MCS table 1.

If the terminal device receives the scheduling information for the time-domain resource length/time-domain length range 2 in operation 102, it may be understood that the scheduling information type corresponding to the scheduling information is the time-domain resource length/time-domain length range 1.

Correspondingly, the operation 103 is specifically implemented as that: the MCS table 2 corresponding to the scheduling information for the time-domain resource length/time-domain length range 2 is determined as the target MCS table based on the scheduling information type, i.e., the time-domain resource length/time-domain length range 2, corresponding to the scheduling information, and the MCS level is analyzed according to the MCS table 2.

Fifth manner: the MCS table is determined based on the DCI format, or it may specifically be understood as that the MCS table is determined based on a length of the DCI format.

MCS tables corresponding to scheduling information for different DCI formats may be determined through the protocol or by the high-layer configuration. The scheduling information for different DCI formats may be understood as different types of scheduling information. For example, scheduling information for a compressed DCI format has a correspondence with the MCS table 1, and scheduling information for a conventional DCI format has a correspondence with the MCS table 2.

Descriptions will be made below with an example. The operation in 102 that the terminal device receives the scheduling information sent by the network side may be as follows.

The terminal receives the scheduling information in the compressed DCI format. It may be understood that the scheduling information type corresponding to the scheduling information is the compressed DCI format.

The operation in 103 that the terminal device determines the target MCS table from the at least two MCS tables based on the scheduling information and the correspondence between scheduling information and MCS tables may include the following operation.

The MCS table 1 is determined from the MCS table 1 and the MCS table 2 as the target MCS table based on the scheduling information type, i.e., the compressed DCI format corresponding to the scheduling information and the correspondence between the scheduling information for the compressed DCI format and the MCS table.

If the terminal device receives the scheduling information in the conventional DCI format in operation 102, it may be understood that the scheduling information type corresponding to the scheduling information is the conventional DCI format.

Correspondingly, the operation 103 is specifically implemented as that: the MCS table 2 is determined as the target MCS table based on the scheduling information type, i.e., the conventional DCI format corresponding to the scheduling information and based on the correspondence between the scheduling information for the conventional DCI format and the MCS table.

Typically, the compressed DCI format may correspond to a small MCS table, and the conventional DCI format may correspond to a large MCS table.

Sixth manner: the MCS table is determined based on the aggregation level.

MCS tables corresponding to scheduling information for different aggregation levels are determined through the protocol or by the high-layer configuration. The scheduling information foe different aggregation levels may be understood as different types of scheduling information. For example, scheduling information for a low aggregation level has a correspondence with the MCS table 1, and scheduling information for a high aggregation level has a correspondence with the MCS table 2.

Descriptions will be made below with an example. The operation in 102 that the terminal device receives the scheduling information sent by the network side may be as follows.

The terminal device receives the scheduling information at a downlink control channel with the low aggregation level. It may be understood that the scheduling information type corresponding to the scheduling information is the low aggregation level.

The operation in 103 that the terminal device determines the target MCS table from the at least two MCS tables based on the scheduling information and the correspondence between the scheduling information and the MCS tables may include the following operation.

The MCS table 1 may be determined as the target MCS table based on the scheduling information type, i.e., the low aggregation level corresponding to the scheduling information and the correspondence between the scheduling information for the low aggregation level and the MCS table.

If the terminal receives the scheduling information at a downlink control channel with the high aggregation level in 102, it may be understood that the scheduling information type corresponding to the scheduling information is the high aggregation level.

Correspondingly, the operation 103 is specifically implemented as that: the MCS table 2 may be determined as the target MCS table based on the scheduling information type, i.e., the high aggregation level corresponding to the scheduling information and the correspondence between the scheduling information for the high aggregation level and the MCS table.

Typically, an MCS table containing high spectral efficiency is configured for the low aggregation level, and an MCS table containing low spectral efficiency is configured for the high aggregation level.

Division for the low aggregation level and the high aggregation level may be configured by a base station or through the protocol. A type of aggregation levels may include one or more aggregation levels. Typically, aggregation levels 1, 2 and 4 correspond to MCS tables containing high spectral efficiency, and aggregation levels 8 and 16 correspond to MCS tables containing low spectral efficiency. Other divisions for the aggregation level may also be adopted and exhaustions are omitted in the embodiment.

Seventh manner: the MCS table is determined based on a service indicator.

A correspondence between scheduling information for different service indicators and MCS tables is determined through the protocol or by the high-layer configuration. The scheduling information for different service indicators may be understood as different types of scheduling information. For example, scheduling information for URLLC has a correspondence with the MCS table 1, and scheduling information for eMBB has a correspondence with the MCS table 2.

Descriptions will be made below with an example. The operation in 102 that the terminal device receives the scheduling information sent by the network side may be as follows.

The scheduling information received by the terminal is DCI used for scheduling the URLLC. It may be understood that the scheduling information type corresponding to the scheduling information is the URLLC.

The operation in 103 that the terminal device determines the target MCS table from the at least two MCS tables based on the scheduling information and the correspondence between scheduling information and MCS tables may include the following operation.

The MCS table 1 may be determined as the target MCS table based on the scheduling information type, i.e., URLLC corresponding to the scheduling information and the correspondence between the scheduling information for the URLLC and the MCS table.

If the scheduling information received by the terminal in operation 102 is DCI used for scheduling eMBB, it may be understood that the scheduling information type corresponding to the scheduling information is the eMBB.

Correspondingly, the operation 103 is specifically implemented as that: the MCS table 2 may be determined as the target MCS table based on the scheduling information type, i.e., eMBB corresponding to the scheduling information and the correspondence between the scheduling information in the eMBB and the MCS table.

Eighth manner: the MCS table is determined based on a control channel CRC.

MCS tables corresponding to scheduling information for different control channel CRCs are determined through the protocol or by the high-layer configuration. The scheduling information for different control channel CRCs may be understood as different types of scheduling information. For example, scheduling information in a control channel CRC type 1 has a correspondence with the MCS table 1, and scheduling information corresponding to a control channel CRC type 2 has a correspondence with the MCS table 2.

Descriptions will be made below with an example. The operation in 102 that the terminal device receives the scheduling information sent by the network side may be as follows.

The scheduling information received by the terminal is DCI with the control channel CRC type 1. It may be understood that the scheduling information type corresponding to the scheduling information is the control channel CRC type 1.

The operation in 103 that the terminal device determines the target MCS table from the at least two MCS tables based on the scheduling information and the correspondence between scheduling information and MCS tables may include the following operation.

The MCS table 1 may be determined as the target MCS table based on the scheduling information type, i.e., the control channel CRC type 1 corresponding to the scheduling information and the correspondence between the scheduling information for the control channel CRC type 1 and the MCS table.

The operation in 102 that the terminal device receives the scheduling information sent by the network side may be as follows.

The scheduling information received by the terminal is DCI with the control channel CRC type 2. It may be understood that the type corresponding to the scheduling information is the control channel CRC type 2.

The operation in 103 that the terminal device determines the target MCS table in the at least two MCS tables based on the scheduling information and the correspondence between the scheduling information and MCS tables may include the following operation.

The MCS table 2 may be determined as the target MCS table based on the scheduling information type, i.e., the control channel CRC type 2 corresponding to the scheduling information and the correspondence between the scheduling information for the control channel CRC type 2 and the MCS table.

Typically, the control channel CRC types may be distinguished from CRC lengths and/or CRC generation manners.

For example, the control channel CRC type 1 is used for URLLC service scheduling, for which an MCS table for URLLC is configured; and the control channel CRC type 2 is used for eMBB service scheduling, for which an MCS table for eMBB is configured.

Ninth manner: the MCS table is determined based on a control channel RNTI.

MCS tables corresponding to scheduling information for different control channel RNTIs are determined through the protocol or by the high-layer configuration. The scheduling information for different control channel RNTIs may be understood as different types of scheduling information. For example, scheduling information for a control channel RNTI type 1 has a correspondence with the MCS table 1, and scheduling information for a control channel RNTI type 2 has a correspondence with the MCS table 2.

Descriptions will be made below with an example. The operation in 102 that the terminal device receives the scheduling information sent by the network side may be as follows.

The scheduling information received by the terminal is DCI scrambled by the control channel RNTI type 1. It may be understood that the scheduling information type corresponding to the scheduling information is the control channel RNTI type 1.

The operation in 103 that the terminal device determines the target MCS table from the at least two MCS tables based on the scheduling information and the correspondence between scheduling information and MCS tables may include the following operation.

The MCS table 1 may be determined as the target MCS table based on the scheduling information type, i.e., the control channel RNTI type 1 corresponding to the scheduling information and the correspondence between the scheduling information for the control channel RNTI type 1 and the MCS table.

The operation in 102 that the terminal device receives the scheduling information sent by the network side may be as follows.

The scheduling information received by the terminal is DCI scrambled by the control channel RNTI type 2. It may be understood that the scheduling information type corresponding to the scheduling information is the control channel RNTI type 2.

The operation in 103 that the terminal device determines the target MCS table from the at least two MCS tables based on the scheduling information and the correspondence between scheduling information and MCS tables may include the following operation.

The MCS table 2 may be determined as the target MCS table based on the scheduling information type, i.e., the control channel RNTI type 2 corresponding to the scheduling information and the correspondence between the scheduling information for the control channel RNTI type 1 and the MCS table.

Typically, the control channel RNTI types may be distinguished from RNTI values.

For example, the control channel RNTI type 1 is configured for URLLC service scheduling, for which an MCS table for URLLC is configured; and the control channel RNTI type 2 is configured for eMBB service scheduling, for which an MCS table for eMBB is configured.

It can be seen that through adoption of the solution, the configuration information of the at least two MCS tables can be acquired in advance, then a target MCS table is selected from the at least two MCS tables according to the scheduling information, and the target MCS table is further used for subsequent processing. As a result, MCS tables can be dynamically configured for adaptation to dynamic scheduling of URLLC and eMBB services. Moreover, through adoption of an implicit indication manner, a physical-layer signaling overhead is reduced, and reliability of physical-layer signaling is improved.

Embodiment 2

Figure 2:
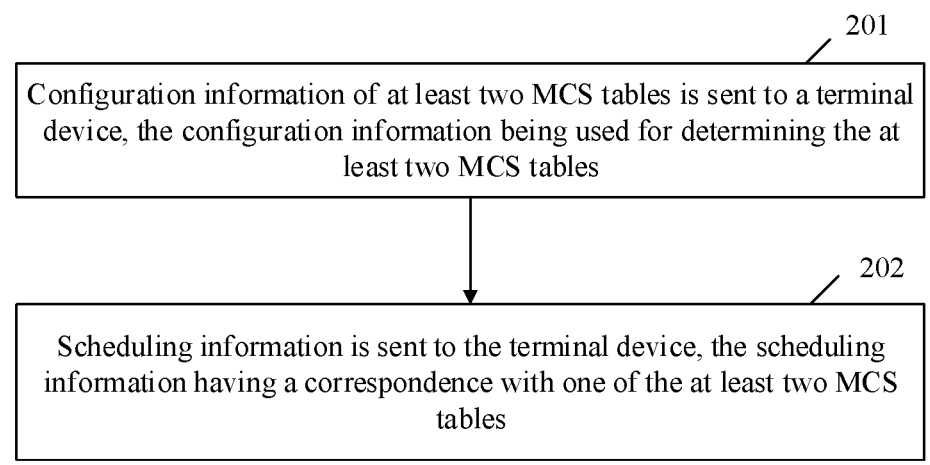
FIG. 2 is a second flowchart of a dynamic configuration method according to an embodiment of the disclosure.

The embodiment of the disclosure provides a dynamic configuration method, which is applied to a network device and, as shown in FIG. 2, includes the following operations.

In 201, configuration information of at least two MCS tables is sent to a terminal device, the configuration information being used for determining the at least two MCS tables.

In 202, scheduling information is sent to the terminal device, the scheduling information having a correspondence with MCS tables.

That is, in the solution provided in the embodiment, the terminal receives the scheduling information, and then the terminal determines the MCS table based on the scheduling information.

Moreover, the terminal device receives the configuration information of the at least two MCS tables from a network side.

The at least two MCS tables at least include a first MCS table and a second MCS table.

The first MCS table is part of the second MCS table, and/or, the first MCS table is formed by elements corresponding to odd or even index values in the second MCS table.

The first MCS table being part of the second MCS table refers that: the first MCS table is a former half of the second MCS table.

It can also be understood that the first MCS table may also be a latter half of the second MCS table and may also be a middle part of the second MCS table. Exhaustions are omitted in the embodiment. Moreover, the former half of the second MCS table may be half of all entries in the second MCS table, specifically a former half of the entries. Correspondingly, the latter half and the middle part of the second MCS table are designated in the same manner and will not be elaborated.

The scheduling information includes at least one of the following types: a CORESET; a search space set; a search space; a time-domain resource indication type; a time-domain resource length; MCS table indication information; a DCI format; an aggregation level; a service indicator; a CRC; or an RNTI.

The control resource set is a CORESET. The search space set is a search space set. The search space is a search space. The time-domain resource indication type is Type A or Type B. The time-domain resource length is a Short TTI or a long TTI. The MCS table indication information is MCS table indication information. The scheduling information further includes MCS table indication information.

The method further includes the following operation.

The correspondence between the scheduling information and MCS tables is determined based on a protocol; or, the correspondence between the scheduling information and MCS tables is determined based on a high-layer configuration. Specifically, the corresponding relationship between the MCS table and the scheduling information is determined through the protocol or by a high-layer configuration.

The method further includes that: a corresponding MCS table is configured for each scheduling information in each type of the scheduling information.

How to determine corresponding MCS tables based on different types of scheduling information respectively will specifically be described below in the following manners.

First manner: the MCS table is determined based on the CORESET configuration.

MCS tables corresponding to scheduling information for different CORESETs may be determined through the protocol or by the high-layer configuration. The scheduling information for different CORESETs may be understood as different types of scheduling information. For example, scheduling information for a CORESET 1 has a correspondence with an MCS table 1, and scheduling information for a CORESET 2 has a correspondence with an MCS table 2.

Correspondingly, if the terminal receives the scheduling information in the CORESET 1, it may be understood that a scheduling information type corresponding to the scheduling information is the CORESET 1, and the terminal determines the MCS table 1 from the MCS table 1 and the MCS table 2 as the target MCS table based on the scheduling information type, i.e., the CORESET 1 corresponding to the scheduling information and the correspondence between the scheduling information for the CORESET 1 and the MCS table. If the terminal device receives the scheduling information for the CORESET 2, it may be understood that the scheduling information type corresponding to the scheduling information is the CORESET 2, and correspondingly, the MCS table 2 is determined as the target MCS table based on the scheduling information type, i.e., the CORESET 2 corresponding to the scheduling information and based on the correspondence between the scheduling information for the CORESET 2 and the MCS table.

In such a manner, a corresponding MCS table may be set in a CORESET, or, a corresponding CORESET type is set in the MCS table through the protocol or by the high-layer configuration. The CORESET configuration may be indicated by high-layer signaling or physical-layer signaling, and may also be determined through the protocol.

In addition, a CORESET for which no MCS table is configured corresponds to a default MCS table. The default MCS table is predetermined through the protocol or notified through signaling Typically, a relatively small MCS table or a low-order MCS table is configured for a high-density CORESET.

That is, when the scheduling information is received by the terminal device, for the CORESET for which no MCS table is configured, the default MCS table may be used for subsequent processing.

The default MCS table may be one of a plurality of MCS tables. For example, if two tables MCS1 and MCS2 are configured at present, it may be designated by the network side or specified through the protocol that the default MCS table is MCS1 (or MCS2).

It is also to be understood that such a configuration manner may be applied to multiple scenarios subsequently described and will not be subsequently elaborated.

Second manner: the MCS table is determined based on the search space set/search space configuration.

In such a manner, the network side determines, through the protocol or by the high-layer configuration, MCS tables corresponding to scheduling information for different search space sets/search spaces. The scheduling information for different search space sets/search spaces may be understood as different types of scheduling information. For example, scheduling information in a search space set/search space 1 has a correspondence with the MCS table 1, and scheduling information for a search space set/search space 2 has a correspondence with the MCS table 2.

Correspondingly, the terminal device receives the scheduling information in the search space set/search space 1, and may determine the MCS table 1 as the target MCS table based on the scheduling information type, i.e., the search space set/search space 1 corresponding to the scheduling information and the correspondence between the scheduling information for the search space set/search space 1 and the MCS table. The terminal receives the scheduling information for the search space set/search space 2, and may determine the MCS table 2 as the target MCS table based on the scheduling information type, i.e., the search space set/search space 2 corresponding to the scheduling information and the correspondence between the scheduling information for the search space set/search space 2 and the MCS table.

Typically, a small MCS table or a low-order MCS table is configured for a search space set/search space with high aggregation level.

Third manner: the MCS table is determined based on the time-domain resource indication type.

MCS tables corresponding to scheduling information for different time-domain resource indication types (for example, a time-domain resource Type A or the time-domain resource Type B) are determined through the protocol or by the high-layer configuration. The scheduling information for different time-domain resource indication types may be understood as different types of scheduling information. For example, scheduling information for the Type A has a correspondence with the MCS table 1, and scheduling information for the Type B has a correspondence with the MCS table 2.

Correspondingly, if the terminal device receives the scheduling information in the time-domain resource Type A, it may be understood that the scheduling information type corresponding to the scheduling information is the time-domain resource Type A, and the MCS table 1 may be determined as the target MCS table based on the scheduling information type, i.e., the time-domain resource Type A corresponding to the scheduling information and the correspondence between the scheduling information in the time-domain resource Type A and the MCS table. If the terminal receives the scheduling information in the Type B, it may be understood that the scheduling information type corresponding to the scheduling information is the time-domain resource Type B, and the MCS table 2 may be determined as the target MCS table based on the type, i.e., the time-domain resource Type B corresponding to the scheduling information and the correspondence between the scheduling information for the time-domain resource Type B and the MCS table. That is, when the scheduling information is received by the terminal device from the network side and the scheduling information is determined to correspond to the time-domain resource Type A, the MCS table 1 is adopted.

Typically, a conventional MCS table is adopted for the time-domain resource Type A, and an MCS table covering an ultra-low bit rate or a relatively small MCS table is adopted for the time-domain resource Type B.

Fourth manner: the MCS table is determined based on the time-domain resource length.

MCS tables corresponding to scheduling information for different time-domain resource lengths/time-domain length ranges are determined through the protocol or by the high-layer configuration. The scheduling information for different time-domain resource lengths/time-domain length ranges may be understood as different types of scheduling information. For example, scheduling information for a time-domain resource length/time-domain length range 1 has a correspondence with the MCS table 1, and scheduling information for a time-domain resource length/time-domain length range 2 has a correspondence with the MCS table 2.

Correspondingly, the terminal device receives the scheduling information in the time-domain resource length/time-domain length range 1. It may be understood that the scheduling information type corresponding to the scheduling information is the time-domain resource length/time-domain length range 1. The MCS table 1 corresponding to the scheduling information for the time-domain resource length/time-domain length range 1 is determined as the target MCS table based on the scheduling information type, i.e., the time-domain resource length/time-domain length range 1 corresponding to the scheduling information, and an MCS level is analyzed according to the MCS table 1.

The terminal device receives the scheduling information in the time-domain resource length/time-domain length range 2. It may be understood that the scheduling information type corresponding to the scheduling information is the time-domain resource length/time-domain length range 1. The MCS table 2 corresponding to the scheduling information for the time-domain resource length/time-domain length range 2 is determined as the target MCS table based on the scheduling information type, i.e., the time-domain resource length/time-domain length range 2 corresponding to the scheduling information, and the MCS level is analyzed according to the MCS table 2.

Fifth manner: the MCS table is determined based on the DCI format, or it may specifically be understood as that the MCS table is determined based on a length of the DCI format.

MCS tables corresponding to scheduling information for different DCI formats may be determined through the protocol or by the high-layer configuration. The scheduling information for different DCI formats may be understood as different types of scheduling information. For example, scheduling information for a compressed DCI format has a correspondence with the MCS table 1, and scheduling information corresponding to a conventional DCI format has a correspondence with the MCS table 2.

The terminal receives the scheduling information in the compressed DCI format. It may be understood that the scheduling information type corresponding to the scheduling information is the compressed DCI format. The MCS table 1 is determined from the MCS table 1 and the MCS table 2 as the target MCS table based on the scheduling information type, i.e., the compressed DCI format corresponding to the scheduling information and the correspondence between the scheduling information for the compressed DCI format and the MCS table.

If the terminal device receives the scheduling information in the conventional DCI format, it may be understood that the scheduling information type corresponding to the scheduling information is the conventional DCI format. Correspondingly, the MCS table 2 is determined as the target MCS table based on the scheduling information type, i.e., the conventional DCI format corresponding to the scheduling information and based on the correspondence between the scheduling information for the conventional DCI format and the MCS table.

Typically, the compressed DCI format may correspond to a small MCS table, and the conventional DCI format may correspond to a large MCS table.

Sixth manner: the MCS table is determined based on the aggregation level.

MCS tables corresponding to scheduling information for different aggregation levels are determined through the protocol or by the high-layer configuration. The scheduling information for different aggregation levels may be understood as different types of scheduling information. For example, scheduling information for a low aggregation level has a correspondence with the MCS table 1, and scheduling information for a high aggregation level has a correspondence with the MCS table 2.

The terminal device receives the scheduling information at a downlink control channel with the low aggregation level. It may be understood that the scheduling information type corresponding to the scheduling information is the low aggregation level. The MCS table 1 may be determined as the target MCS table based on the scheduling information type, i.e., the low aggregation level corresponding to the scheduling information and the correspondence between the scheduling information for the low aggregation level and the MCS table.

It may be understood that if the terminal device receives the scheduling information at a downlink control channel with the high aggregation level, the scheduling information type corresponding to the scheduling information is the high aggregation level. The MCS table 2 may be determined as the target MCS table based on the scheduling information type, i.e., the high aggregation level corresponding to the scheduling information and the correspondence between the scheduling information for the high aggregation level and the MCS table.

Typically, an MCS table containing a high spectral efficiency is configured for the low aggregation level, and an MCS table containing a low spectral efficiency is configured for the high aggregation level.

Division of the low aggregation level and the high aggregation level may be configured by a base station or determined through the protocol. A type of aggregation levels may include one or more aggregation levels. Typically, aggregation levels 1, 2 and 4 correspond to MCS tables containing the high spectral efficiency, and aggregation levels 8 and 16 correspond to MCS tables containing the low spectral efficiency. Other divisions for aggregation level may also be adopted and exhaustions are omitted in the embodiment.

Seventh manner: the MCS table is determined based on a service indicator.

A correspondence between scheduling information corresponding to different service indicators and MCS tables is determined through the protocol or by the high-layer configuration. The scheduling information corresponding to different service indicators may be understood as different types of scheduling information. For example, scheduling information for URLLC has a correspondence with the MCS table 1, and scheduling information for eMBB has a correspondence with the MCS table 2.

The scheduling information received by the terminal is DCI used for scheduling the URLLC. It may be understood that the scheduling information type corresponding to the scheduling information is the URLLC. The MCS table 1 may be determined as the target MCS table based on the scheduling information type, i.e., URLLC corresponding to the scheduling information and the correspondence between the scheduling information for the URLLC and the MCS table.

If the scheduling information received by the terminal is DCI used for scheduling eMBB, it may be understood that the scheduling information type corresponding to the scheduling information is the eMBB. The MCS table 2 may be determined as the target MCS table based on the scheduling information type, i.e., eMBB corresponding to the scheduling information and the correspondence between the scheduling information for the eMBB and the MCS table.

Eighth manner: the MCS table is determined based on a control channel CRC.

MCS tables corresponding to scheduling information for different control channel CRCs are determined through the protocol or by the high-layer configuration. The scheduling information for different control channel CRCs may be understood as different types of scheduling information. For example, scheduling information for a control channel CRC type 1 has a correspondence with the MCS table 1, and scheduling information for a control channel CRC type 2 has a correspondence with the MCS table 2.

The scheduling information received by the terminal is DCI scrambled by adopting the control channel CRC type 1. It may be understood that the scheduling information type corresponding to the scheduling information is the control channel CRC type 1. The MCS table 1 may be determined as the target MCS table based on the scheduling information type, i.e., the control channel CRC type 1 corresponding to the scheduling information and the correspondence between the scheduling information for the control channel CRC type 1 and the MCS table.

The scheduling information received by the terminal is DCI scrambled by adopting the control channel CRC type 2. It may be understood that the scheduling information type corresponding to the scheduling information is the control channel CRC type 2. The MCS table 2 may be determined as the target MCS table based on the scheduling information type, i.e., the control channel CRC type 2, and the correspondence between the scheduling information in the control channel CRC type 2 and the MCS table.

Typically, the control channel CRC types may be distinguished from CRC lengths and/or CRC generation manners.

For example, the control channel CRC type 1 is configured for URLLC service scheduling, for which an MCS table for URLLC is configured; and the control channel CRC type 2 is configured for eMBB service scheduling, for which an MCS table for eMBB is configured.

Ninth manner: the MCS table is determined based on a control channel RNTI.

MCS tables corresponding to scheduling information for different control channel RNTIs are predetermined through the protocol or by the high layer configuration. The scheduling information for different control channel RNTIs may be understood as different types of scheduling information. For example, scheduling information for a control channel RNTI type 1 has a correspondence with the MCS table 1, and scheduling information for a control channel RNTI type 2 has a correspondence with the MCS table 2.

The scheduling information received by the terminal is DCI scrambled by the control channel RNTI type 1. It may be understood that the scheduling information type corresponding to the scheduling information is the control channel RNTI type 1. The MCS table 1 may be determined as the target MCS table based on the scheduling information type, i.e., the control channel RNTI type 1 corresponding to the scheduling information and the correspondence between the scheduling information corresponding to the control channel RNTI type 1 and the MCS table.

The scheduling information received by the terminal is DCI scrambled by the control channel RNTI type 2. It may be understood that the scheduling information type corresponding to the scheduling information is the control channel RNTI type 2. The MCS table 2 may be determined as the target MCS table based on the scheduling information type, i.e., the control channel RNTI type 2 corresponding to the scheduling information and the correspondence between the scheduling information for the control channel RNTI type 1 and the MCS table.

Typically, the control channel RNTI types may be distinguished from RNTI values.

For example, the control channel RNTI type 1 is configured for URLLC service scheduling, and an MCS table for URLLC is configured for it; and the control channel RNTI type 2 is configured for eMBB service scheduling, and an MCS table for eMBB is configured for it.

It can be seen that through adoption of the solution, the configuration information of the at least two MCS tables can be acquired in advance, then the target MCS table is selected from the at least two MCS tables according to the scheduling information, and the target MCS table is further adopted for subsequent processing. As a result, MCS tables may be dynamically configured for adaptation to dynamic scheduling of URLLC and eMBB services. Moreover, an implicit indication manner is adopted, so that a physical-layer signaling overhead is reduced, and reliability of physical-layer signaling thereby is improved.

Embodiment 3

Figure 3:
FIG. 3 is a composition structure diagram of a terminal device according to an embodiment of the disclosure.

The embodiment of the disclosure provides a terminal device, which, as shown in FIG. 3, includes a first communication unit 31 and a first processing unit 32.

The first communication unit 31 is configured to receive configuration information of at least two MCS tables, the configuration information being used for determining the at least two MCS tables; and receive scheduling information sent by a network side.

The first processing unit 32 is configured to determine a target MCS table from the at least two MCS tables based on the scheduling information and a correspondence between scheduling information and MCS tables.

That is, in the solution provided in the embodiment, the terminal device receives the scheduling information, and then the terminal device determines the MCS table based on the scheduling information.

Moreover, the terminal device receives the configuration information of the at least two MCS tables from a network side.

The at least two MCS tables at least include a first MCS table and a second MCS table.

The first MCS table is part of the second MCS table, and/or, the first MCS table is formed by elements corresponding to odd or even index values in the second MCS table.

The first MCS table being part of the second MCS table refers to that: the first MCS table is a former half of the second MCS table.

It can also be understood that the first MCS table may also be a latter half of the contents of the second MCS table and may also be a middle part of the contents of the second MCS table. Exhaustions are omitted in the embodiment. Moreover, the former half of the contents of the second MCS table may be half of all entries in the second MCS table, specifically a former half of the entries. Correspondingly, the latter half and the middle part of the contents of the second MCS table are designated in the same manner and will not be elaborated herein.

The scheduling information includes at least one of the following types: a CORESET; a search space set; a search space; a time-domain resource indication type; a time-domain resource length; MCS table indication information; a DCI format; an aggregation level; a service indicator; a CRC; or an RNTI.

The control resource set may be a CORESET. The search space set may be a search space set. The search space may be a search space. The time-domain resource indication type may be, for example, Type A or Type B. The time-domain resource length may be a Short TTI or a long TTI. The scheduling information may further include MCS table indication information.

The first processing unit 32 is configured to determine the correspondence between the scheduling information and MCS tables based on a protocol, or, determine the correspondence between the scheduling information and MCS tables based on a high-layer configuration. Specifically, the corresponding relationship between MCS tables and the scheduling information is determined through the protocol or by a high-layer configuration.

The first processing unit 32 is configured to configure a corresponding MCS table for each scheduling information in each type of the scheduling information.

Correspondingly, the first processing unit 32 is configured to determine a scheduling information type corresponding to the received scheduling information.

The target MCS table is determined from the at least two MCS tables based on the scheduling information type corresponding to the scheduling information and a correspondence between the scheduling information scheduling information and an MCS table.

The scheduling information type corresponding to the scheduling information may specifically include one of the following types: the CORESET; the search space set; the search space; the time-domain resource indication type; the time-domain resource length; or the MCS table indication information. Moreover, each type of the scheduling information may include different scheduling information, such as, a CORESERT A, a CORESET B, or a search space set A, a search space set B, which may all be understood as different scheduling information for different types of the scheduling information and may generally be understood as different types of scheduling information.

How to determine corresponding MCS tables based on different types of scheduling information respectively will specifically be described below in the following manners.

First manner: the MCS table is determined based on the CORESET configuration.

MCS tables corresponding to scheduling information for different CORESETs may be determined through the protocol or by the high layer configuration. The scheduling information for different CORESETs may be understood as different types of scheduling information. For example, scheduling information for a CORESET 1 has a correspondence with an MCS table 1, and scheduling information for a CORESET 2 has a correspondence with an MCS table 2.

Descriptions will be made below with an example. The scheduling information is received in the CORESET 1 by the terminal device. It may be understood that the scheduling information type corresponding to the scheduling information is the CORESET 1.

The first processing unit 32 is configured to determine the MCS table 1 from the MCS table 1 and the MCS table 2 as the target MCS table based on the scheduling information type, i.e., CORESET 1 corresponding to the scheduling information and the correspondence between the scheduling information for the CORESET 1 and the MCS table.

If the scheduling information corresponding to the CORESET 2 is received, it may be understood that the scheduling information type corresponding to the scheduling information is the CORESET 2. The first processing unit 32 is configured to determine the MCS table 2 as the target MCS table based on the scheduling information type, i.e., CORESET 2 corresponding to the scheduling information and based on the correspondence between the scheduling information for the CORESET 2 and the MCS table.

In such a manner, a corresponding MCS table may be configured in a CORESET, or, a corresponding CORESET type is configuration in the MCS table through the protocol or by the high layer configuration. The CORESET configuration may be indicated by high-layer signaling or physical-layer signaling, and may also be determined through the protocol.

In addition, a CORESET for which no MCS table is configured corresponds to a default MCS table. The default MCS table is predetermined through the protocol or notified through signaling. Typically, a small MCS table or a low-order MCS table is configured for a high-density CORESET.

That is, when the scheduling information is received by the terminal device, in a case that the scheduling information corresponds to the CORESET for which no MCS table is configured, the default MCS table may be used for subsequent processing.

The default MCS table may be one of multiple MCS tables. For example, if two tables MCS1 and MCS2 are configured at present, it may be designated by the network side or specified through the protocol that the default MCS table is MCS1 (or MCS2).

It is also to be understood that such a configuration manner may be applied to multiple scenarios subsequently described and will not be subsequently elaborated.

Second manner: the MCS table is determined based on the search space set/search space configuration.

In such a manner, the network side specifies, through the protocol or the high layer configuration. MCS tables corresponding to scheduling information for different search space sets/search spaces. The scheduling information for different search space sets/search spaces may be understood as different types of scheduling information. For example, scheduling information for a search space set/search space 1 has a correspondence with the MCS table 1, and scheduling information for a search space set/search space 2 has a correspondence with the MCS table 2.

Descriptions will be made below with an example. The scheduling information is received in the search space set/search space 1 by the terminal device. It may be understood that the scheduling information type corresponding to the scheduling information is the search space set/search space 1. The first processing unit 32 may be configured to determine the MCS table 1 as the target MCS table based on the scheduling information type, i.e., the search space set/search space 1 corresponding to the scheduling information and the correspondence between the scheduling information for the search space set/search space 1 and the MCS table.

If the scheduling information in the search space set/search space 2 is received, it may be understood that the scheduling information type corresponding to the scheduling information is the search space set/search space 2.

Correspondingly, the first processing unit 32 may be configured to determine the MCS table 2 as the target MCS table based on the scheduling information type, i.e., the search space set/search space 2 corresponding to the scheduling information and the correspondence between the scheduling information for the search space set/search space 2 and the MCS table.

Typically, a configuration manner may be as follows: a small MCS table or a low-order MCS table is configured for a search space set/search space with high aggregation level.

Third manner: the MCS table is determined based on the time-domain resource indication type.

MCS tables corresponding to scheduling information for different time-domain resource indication types (for example, a time-domain resource Type A or time-domain resource Type B) are determined through the protocol or by the high layer configuration. The scheduling information for different time-domain resource indication types may be understood as different types of scheduling information. For example, scheduling information for the Type A has a correspondence with the MCS table 1, and scheduling information for the time-domain resource Type B forms a correspondence with the MCS table 2.

Descriptions will be made below with an example. The first communication unit 31 is configured to receive the scheduling information in the Type A. It may be understood that the scheduling information type corresponding to the scheduling information is the Type A.

The first processing unit 32 may be configured to determine the MCS table 1 as the target MCS table based on the scheduling information type, i.e., the Type A corresponding to the scheduling information and the correspondence between the scheduling information corresponding to the time-domain resource Type A and the MCS table.

If the first communication unit 31 is configured to receive the scheduling information corresponding to the time-domain resource Type B, it may be understood that the scheduling information type corresponding to the scheduling information is the time-domain resource Type B.

Correspondingly, the first processing unit 32 may be configured to determine the MCS table 2 as the target MCS table based on the scheduling information type, i.e., time-domain resource Type B corresponding to the scheduling information and the correspondence between the scheduling information for the time-domain resource Type B and the MCS table.

That is, when the scheduling information is received by the terminal device from the network side and the scheduling information is determined to correspond to the time-domain resource Type A, the MCS table 1 is adopted.

Typically, a conventional MCS table is adopted for the time-domain resource Type A, and an MCS table covering an ultra-low bit rate or a relatively small MCS table is adopted for the time-domain resource Type B.

Fourth manner: the MCS table is determined based on the time-domain resource length.

MCS tables corresponding to scheduling information for different time-domain resource lengths/time-domain length ranges are predetermined through the protocol or by the high layer configuration. The scheduling information for different time-domain resource lengths/time-domain length ranges may be understood as different types of scheduling information. For example, scheduling information for a time-domain resource length/time-domain length range 1 has a correspondence with the MCS table 1, and scheduling information for a time-domain resource length/time-domain length range 2 has a correspondence with the MCS table 2.

Descriptions will be made below with an example. The first communication unit 31 is configured to receive the scheduling information in the time-domain resource length/time-domain length range 1. It may be understood that the scheduling information type corresponding to the scheduling information is the time-domain resource length/time-domain length range 1.

The first processing unit 32 is configured to determine an MCS table 1 corresponding to the scheduling information for the time-domain resource length/time-domain length range 1 as the target MCS table based on the scheduling information type, i.e., the time-domain resource length/time-domain length range 1 corresponding to the scheduling information, and analyzes an MCS level according to the MCS table 1.

If the first communication unit 31 is configured to receive the scheduling information in the time-domain resource length/time-domain length range 2, it may be understood that the scheduling information type corresponding to the scheduling information is the time-domain resource length/time-domain length range 1.

Correspondingly, the first processing unit 32 is configured to determine an MCS table 2 corresponding to the scheduling information in the time-domain resource length/time-domain length range 2 as the target MCS table based on the scheduling information type, i.e., the time-domain resource length/time-domain length range 2 corresponding to the scheduling information, and analyze the MCS level according to the MCS table 2.

Fifth manner: the MCS table is determined based on the DCI format, or it may specifically be understood as that the MCS table is determined based on a length of the DCI format.

MCS tables corresponding to scheduling information for different DCI formats may be predetermined through the protocol or by the high layer configuration. The scheduling information for different DCI formats may be understood as different types of scheduling information. For example, scheduling information for a compressed DCI format has a correspondence with an MCS table 1, and scheduling information for a conventional DCI format has a correspondence with an MCS table 2.

Descriptions will be made below with an example. The scheduling information is received in the compressed DCI format. It may be understood that the scheduling information type corresponding to the scheduling information is the compressed DCI format. The first processing unit 32 is configured to determine the MCS table 1 from the MCS table 1 and the MCS table 2 as the target MCS table based on the scheduling information type, i.e., the compressed DCI format corresponding to the scheduling information and the correspondence between the scheduling information for the compressed DCI format and the MCS table.

If the scheduling information is received in the conventional DCI format by the terminal device, it may be understood that the scheduling information type corresponding to the scheduling information is the conventional DCI format.

Correspondingly, the first processing unit 32 is configured to determine the MCS table 2 as the target MCS table based on the scheduling information type, i.e., the conventional DCI format corresponding to the scheduling information and based on the correspondence between the scheduling information for the conventional DCI format and the MCS table.

Typically, the compressed DCI format may correspond to a small MCS table, and the conventional DCI format may correspond to a large MCS table.

Sixth manner: the MCS table is determined based on the aggregation level.

MCS tables corresponding to scheduling information for different aggregation levels are predetermined through the protocol or by the high layer configuration. The scheduling information for different aggregation levels may be understood as different types of scheduling information. For example, scheduling information for a low aggregation level has a correspondence with the MCS table 1, and scheduling information for a high aggregation level has a correspondence with the MCS table 2.

Descriptions will be made below with an example. The first communication unit 31 is configured to receive the scheduling information at a downlink control channel with the low aggregation level. It may be understood that the scheduling information type corresponding to the scheduling information is the low aggregation level.

The first processing unit 32 may be configured to determine the MCS table 1 as the target MCS table based on the scheduling information type, i.e., the low aggregation level corresponding to the scheduling information and the correspondence between the scheduling information for the low aggregation level and the MCS table.

If the first communication unit 31 receives the scheduling information at a downlink control channel with the high aggregation level. it may be understood that the scheduling information type corresponding to the scheduling information is the high aggregation level.

Correspondingly, the first processing unit 32 may be configured to determine the MCS table 2 as the target MCS table based on the scheduling information type, i.e., the high aggregation level corresponding to the scheduling information and the correspondence between the scheduling information for the high aggregation level and the MCS table.

Typically, an MCS table containing high spectral efficiency is configured for the low aggregation level, and an MCS table containing low spectral efficiency is configured for the high aggregation level.

Division of the low aggregation level and the high aggregation level may be configured by a base station or predetermined through the protocol. A type of aggregation levels may include one or more aggregation levels. Typically, aggregation levels 1, 2 and 4 correspond to MCS tables containing high spectral efficiency, and aggregation levels 8 and 16 correspond to MCS tables containing low spectral efficiency. Other divisions for the aggregation level may also be adopted and exhaustions are omitted in the embodiment.

Seventh manner: the MCS table is determined based on a service indicator.

A correspondence between scheduling information corresponding to different service indicators and MCS tables is predetermined through the protocol or by the high layer configuration. The scheduling information corresponding to different service indicators may be understood as different types of scheduling information. For example, scheduling information corresponding to URLLC has a correspondence with the MCS table 1, and scheduling information corresponding to eMBB has a correspondence with the MCS table 2.

Descriptions will be made below with an example. The scheduling information received by the first communication unit 31 is DCI used for scheduling URLLC. It may be understood that the scheduling information type corresponding to the scheduling information is the URLLC.

The first processing unit 32 may be configured to determine the MCS table 1 as the target MCS table based on the scheduling information type, i.e., URLLC corresponding to the scheduling information and based on the correspondence between the scheduling information in the URLLC and the MCS table.

If the scheduling information received by the first communication unit 31 is DCI used for scheduling of eMBB, it may be understood that the type corresponding to the scheduling information is the eMBB.

Correspondingly, the first processing unit 32 may determine the MCS table 2 as the target MCS table based on the type, i.e., eMBB corresponding to the scheduling information and the correspondence between the scheduling information corresponding to eMBB and the MCS table.

Eighth manner: the MCS table is determined based on a control channel CRC.

MCS tables corresponding to scheduling information for different control channel CRCs are predetermined through the protocol or by the high layer configuration. The scheduling information for different control channel CRCs may be understood as different types of scheduling information. For example, scheduling information for a control channel CRC type 1 forms a correspondence with an MCS table 1, and scheduling information for a control channel CRC type 2 forms a correspondence with an MCS table 2.

Descriptions will be made below with an example. The scheduling information received by the first communication unit 31 is DCI with the control channel CRC type 1. It may be understood that the scheduling information type corresponding to the scheduling information is the control channel CRC type 1.

The first processing unit 32 may be configured to determine the MCS table 1 as the target MCS table based on the scheduling information type, i.e., the control channel CRC type 1 corresponding to the scheduling information and the correspondence between the scheduling information for the control channel CRC type 1 and the MCS table.

If the scheduling information received by the first communication unit 31 is DCI with the control channel CRC type 2, it may be understood that the scheduling information type corresponding to the scheduling information is the control channel CRC type 2.

The first processing unit 32 may be configured to determine the MCS table 2 as the target MCS table based on the scheduling information type, i.e., the control channel CRC type 2 corresponding to the scheduling information and the correspondence between the scheduling information for the control channel CRC type 2 and the MCS table.

Typically, the control channel CRC types may be distinguished from CRC lengths and/or CRC generation manners.

For example, the control channel CRC type 1 is configured for URLLC service scheduling, for which an MCS table for URLLC is configured; and the control channel CRC type 2 is configured for eMBB service scheduling, for which an MCS table for eMBB is configured.

Ninth manner: the MCS table is determined based on a control channel RNTI.

MCS tables corresponding to scheduling information for different control channel RNTIs are predetermined through the protocol or by the high layer configuration. The scheduling information for different control channel RNTIs may be understood as different types of scheduling information. For example, scheduling information for a control channel RNTI type 1 has a correspondence with an MCS table 1, and scheduling information in a control channel RNTI type 2 has a correspondence with an MCS table 2.

Descriptions will be made below with an example. The scheduling information received by the first communication unit 31 is DCI scrambled by the control channel RNTI type 1. It may be understood that the scheduling information type corresponding to the scheduling information is the control channel RNTI type 1.

The first processing unit 32 may be configured to determine the MCS table 1 as the target MCS table based on the scheduling information type, i.e., the control channel RNTI type 1 corresponding to the scheduling information and the correspondence between the scheduling information for the control channel RNTI type 1 and the MCS table.

If the scheduling information received by the first communication unit 31 is DCI scrambled by the control channel RNTI type 2, it may be understood that the scheduling information type corresponding to the scheduling information is the control channel RNTI type 2.

The first processing unit 32 may be configured to determine the MCS table 2 as the target MCS table based on the scheduling information type, i.e., the control channel RNTI type 2 corresponding to the scheduling information and the correspondence between the scheduling information for the control channel RNTI type 2 and the MCS table.

Typically, the control channel RNTI types may be distinguished from RNTI values.

For example, the control channel RNTI type 1 is configured for URLLC service scheduling, for which an MCS table for URLLC is configured; and the control channel RNTI type 2 is configured for eMBB service scheduling, for which an MCS table for eMBB is configured.

It can be seen that through adoption of the solution, the configuration information of the at least two MCS tables may be acquired in advance, then a target MCS table is selected or determined from the at least two MCS tables according to the scheduling information, and the target MCS table is further used for subsequent processing. As a result, MCS tables may be dynamically configured for adaptation to dynamic scheduling of URLLC and eMBB services. Moreover, an implicit indication manner is adopted, so that a physical-layer signaling overhead is reduced, and reliability of physical-layer signaling is improved.

Embodiment 4

Figure 4:
FIG. 4 is a composition structure diagram of a network device according to an embodiment of the disclosure.

The embodiment of the disclosure provides a network device, which, as shown in FIG. 4, includes a second communication unit 41.

The second communication unit 41 is configured to send configuration information of at least two MCS tables to a terminal device, the configuration information being used for determining the at least two MCS tables; and send scheduling information to the terminal device, the scheduling information forming a correspondence with an MCS table.

That is, in the solution provided in the embodiment, the terminal device receives the scheduling information, and then the terminal device determines the MCS table based on the scheduling information.

Moreover, the terminal device receives the configuration information of the at least two MCS tables from a network side.

The at least two MCS tables at least include a first MCS table and a second MCS table.

The first MCS table is part of the second MCS table, and/or, the first MCS table is formed by elements corresponding to odd or even index values in the second MCS table.

That the first MCS table is part of the second MCS table refers to that: the first MCS table is a former half of the second MCS table.

It can also be understood that the first MCS table may also be a latter half of the second MCS table and may also be a middle part of the second MCS table. Exhaustions are omitted in the embodiment. Moreover, the former half of the second MCS table may be half of all entries in the second MCS table, specifically a former half of the entries. Correspondingly, the latter half and the middle part of the second MCS table are designated in the same manner and will not be elaborated.

The scheduling information includes at least one of the following types: a CORESET; a search space set; a search space; a time-domain resource indication type; a time-domain resource length; MCS table indication information; a DCI format; an aggregation level; a service indicator; a CRC; or an RNTI.

The control resource set may be a CORESET. The search space set may be a search space set. The search space is a search space. The time-domain resource indication type may be Type A or Type B. The time-domain resource length may be a Short TTI or a long TTI. The scheduling information may be MCS table indication information.

The network device further includes a second processing unit 42.

The second processing unit 42 is configured to determine the correspondence between the scheduling information and MCS tables based on a protocol, or, determine the correspondence between the scheduling information and MCS tables based on a high-layer configuration. Specifically, the corresponding relationship between the MCS tables and the scheduling information is predetermined through the protocol or by a high layer configuration.

The second processing unit 42 is configured to configure a corresponding MCS table for each scheduling information in each type of the scheduling information.

How to determine corresponding MCS tables based on different types of scheduling information respectively will specifically be described below in the following manners.

First manner: the MCS table is determined based on the CORESET configuration.

MCS tables corresponding to scheduling information for different CORESETs may be predetermined through the protocol or by the high layer configuration. The scheduling information for different CORESETs may be understood as different types of scheduling information. For example, scheduling information for a CORESET 1 forms a correspondence with an MCS table 1, and scheduling information for a CORESET 2 forms a correspondence with an MCS table 2.

In such a manner, a corresponding MCS table may be set in a CORESET, or, a corresponding CORESET type is set in the MCS table through the protocol or by the high layer configuration. The CORESET configuration may be indicated by high-layer signaling or physical-layer signaling, and may also be predetermined through the protocol.

In addition, a CORESET for which no MCS table is configured corresponds to a default MCS table. The default MCS table is predetermined through the protocol or notified through signaling. Typically, a small MCS table or a low-order MCS table is configured for a CORESET with high-density.

That is, when the scheduling information is received, for the CORESET for which no MCS table is configured, the default MCS table may be adopted for subsequent processing.

The default MCS table may be one of multiple MCS tables. For example, if two tables MCS1 and MCS2 are configured at present, it may be designated by the network side or specified through the protocol that the default MCS table is MCS1 (or MCS2).

It is also to be understood that such a configuration manner may be applied to multiple scenarios subsequently described and will not be subsequently elaborated.

Second manner: the MCS table is determined based on the search space set/search space configuration.

In such a manner, the network side specifies, through the protocol or the high layer configuration, MCS tables corresponding to scheduling information for different search space sets/search spaces. The scheduling information for different search space sets/search spaces may be understood as different types of scheduling information. For example, scheduling information for a search space set/search space 1 forms a correspondence with the MCS table 1, and scheduling information for a search space set/search space 2 forms a correspondence with the MCS table 2.

Typically, a small MCS table or a low-order MCS table is configured for a search space set/search space with high aggregation level.

Third manner: the MCS table is determined based on the time-domain resource indication type.

MCS tables corresponding to scheduling information for different time-domain resource indication types (for example, a time-domain resource Type A or time-domain resource Type B) are predetermined through the protocol or by the high layer configuration. The scheduling information for different time-domain resource indication types may be understood as different types of scheduling information. For example, scheduling information in the time-domain resource Type A has a correspondence with the MCS table 1, and scheduling information corresponding to the time-domain resource Type B has a correspondence with the MCS table 2.

Typically, a conventional MCS table is adopted for the time-domain resource Type A, and an MCS table covering an ultra-low bit rate or a small MCS table is adopted for the time-domain resource Type B.

Fourth manner: the MCS table is determined based on the time-domain resource length.

MCS tables corresponding to scheduling information for different time-domain resource lengths/time-domain length ranges are predetermined through the protocol or by the high layer configuration. The scheduling information for different time-domain resource lengths/time-domain length ranges may be understood as different types of scheduling information. For example, scheduling information for a time-domain resource length/time-domain length range 1 forms a correspondence with the MCS table 1, and scheduling information for a time-domain resource length/time-domain length range 2 forms a correspondence with the MCS table 2.

Fifth manner: the MCS table is determined based on the DCI format, or it may specifically be understood as that the MCS table is determined based on a DCI format length.

MCS tables corresponding to scheduling information for different DCI formats may be predetermined through the protocol or by the high layer configuration. The scheduling information for different DCI formats may be understood as different types of scheduling information. For example, scheduling information for a compressed DCI format has a correspondence with the MCS table 1, and scheduling information for a conventional DCI format has a correspondence with the MCS table 2.

Typically, the compressed DCI format may correspond to a small MCS table, and the conventional DCI format may correspond to a large MCS table.

Sixth manner: the MCS table is determined based on the aggregation level.

MCS tables corresponding to scheduling information for different aggregation levels are predetermined through the protocol or by the high layer configuration. The scheduling information for different aggregation levels may be understood as different types of scheduling information. For example, scheduling information for a low aggregation level has a correspondence with the MCS table 1, and scheduling information for a high aggregation level forms a correspondence with the MCS table 2.

Typically, an MCS table containing high spectral efficiency is configured for the low aggregation level, and an MCS table containing low spectral efficiency is configured for the high aggregation level.

Division of the low aggregation level and the high aggregation level may be configured by a base station or predetermined through the protocol. A type of aggregation levels may include one or more aggregation levels. Typically, aggregation levels 1, 2 and 4 correspond to MCS tables containing high spectral efficiency, and aggregation levels 8 and 16 correspond to MCS tables containing low spectral efficiency. Of course, another division manner may also be adopted and exhaustions are omitted in the embodiment.

Seventh manner: the MCS table is determined based on a service indicator.

A correspondence between scheduling information corresponding to different service indicators and MCS tables is predetermined through the protocol or by the high layer configuration. The scheduling information corresponding to different service indicators may be understood as different types of scheduling information. For example, scheduling information corresponding to URLLC has a correspondence with the MCS table 1, and scheduling information corresponding to eMBB has a correspondence with the MCS table 2.

Eighth manner: the MCS table is determined based on a control channel CRC.

MCS tables corresponding to scheduling information for different control channel CRCs are predetermined through the protocol or by the high layer configuration. The scheduling information for different control channel CRCs may be understood as different types of scheduling information. For example, scheduling information for a control channel CRC type 1 has a correspondence with the MCS table 1, and scheduling information for a control channel CRC type 2 has a correspondence with the MCS table 2.

Typically, the control channel CRC types may be distinguished from CRC lengths and/or CRC generation manners.

For example, the control channel CRC type 1 is configured for URLLC service scheduling, for which an MCS table for URLLC is configured; and the control channel CRC type 2 is configured for eMBB service scheduling, for which an MCS table for eMBB is configured.

Ninth manner: the MCS table is determined based on a control channel RNTI.

MCS tables corresponding to scheduling information for different control channel RNTIs are predetermined through the protocol or by the high layer configuration. The scheduling information for different control channel RNTIs may be understood as different types of scheduling information. For example, scheduling information for a control channel RNTI type 1 has a correspondence with the MCS table 1, and scheduling information for a control channel RNTI type 2 has a correspondence with the MCS table 2.

Typically, the control channel RNTI types may be distinguished from RNTI values.

For example, the control channel RNTI type 1 is configured for URLLC service scheduling, for which an MCS table for URLLC is configured; and the control channel RNTI type 2 is configured for eMBB service scheduling, for which an MCS table for eMBB is configured.

It can be seen that through adoption of the solution, the configuration information of the at least two MCS tables can be acquired in advance, then the target MCS table is selected or determined from the at least two MCS tables according to the scheduling information, and the target MCS table is further adopted for subsequent processing. As a result, MCS tables may be dynamically configured for adaptation to dynamic scheduling of URLLC and eMBB services. Moreover, an implicit indication manner is adopted, so that a physical-layer signaling overhead is reduced, and reliability of physical-layer signaling is improved.

Figure 5:
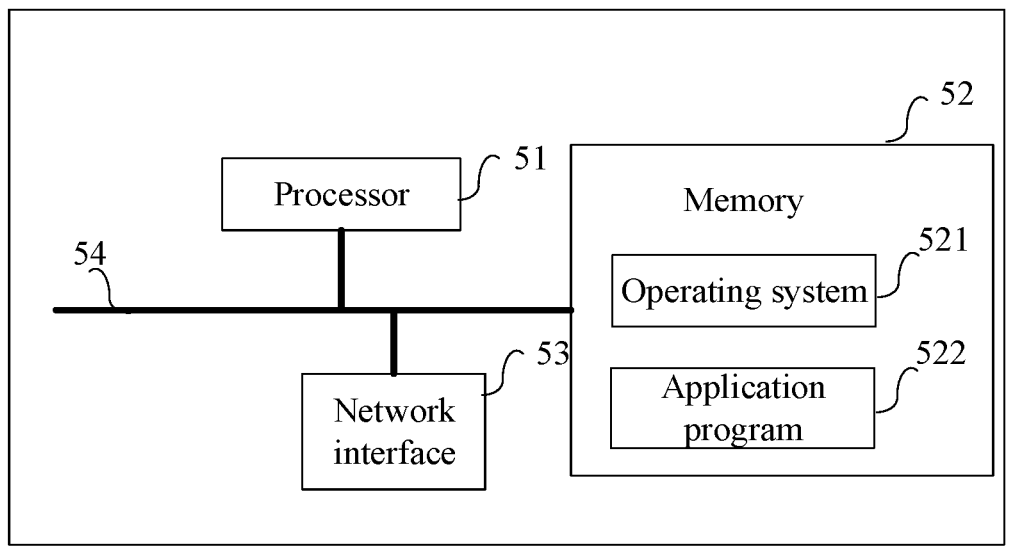
FIG. 5 is a schematic diagram of a hardware architecture according to an embodiment of the disclosure.

An embodiment of the disclosure also provides a hardware composition architecture of a terminal device or a network device, which, as shown in FIG. 5, includes at least one processor 51, a memory 52 and at least one network interface 53. Each component is coupled together through a bus system 54. It may be understood that the bus system 54 is configured to implement connection communication between these components. The bus system 54 includes a data bus and further includes a power bus, a control bus and a state signal bus. However, for clear description, various buses are marked as the bus system 54 in FIG. 5.

It can be understood that the memory 52 in the embodiment of the disclosure may be a volatile memory or a nonvolatile memory, or may include both the volatile and nonvolatile memories.

In some implementation modes, the memory 52 is configured to store the following elements, executable modules or data structures, or a subset thereof or an extended set thereof:

an operating system 521 and an application program 522.

The processor 51 is configured to be capable of processing the operations of the method in embodiment 1 or 2, which will not be elaborated herein.

An embodiment of the disclosure provides a computer storage medium, which stores computer-executable instructions that, when being executed, implement the operations of the method in embodiment 1 or 2.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A dynamic configuration method, applied to a terminal device and comprising:
   receiving, by the terminal device, Downlink Control Information (DCI) from a network side, wherein the DCI is scrambled by a Radio Network Temporary Identity (RNTI); and
   determining, by the terminal device, a target Modulation and Coding Scheme (MCS) table from at least two MCS tables based on a type of the RNTI used for scrambling the DCI and a correspondence between the at least two MCS tables and multiple RNTI types used for scrambling DCIs.

2. The method of claim 1, further comprising:
   receiving, by the terminal device, configuration information of the at least two MCS tables, the configuration information being used for determining the at least two MCS tables.

3. The method of claim 1, wherein
   a search space is further used by the terminal device to determine the target MCS table from the at least two MCS tables.

4. The method of claim 3, wherein:
   a corresponding MCS table is configured for each RNTI type.

5. The method of claim 4, further comprising:
   determining the type of the RNTI for scrambling the DCI.

6. The method of claim 1, wherein
   the correspondence between the at least two MCS tables and the multiple RNTI types used for scrambling the DCIs is determined based on a protocol; or, determined based on a high-layer configuration.

7. A dynamic configuration method, applied to a network device and comprising:
   sending, by the network device, Downlink Control Information (DCI) scrambled by a Radio Network Temporary Identity (RNTI) to a terminal device, to enable the terminal device to determine a target Modulation and Coding Scheme (MCS) table from at least two MCS tables based on a type of the RNTI used for scrambling the DCI and a correspondence between the at least two MCS tables and multiple RNTI types used for scrambling DCIs.

8. The method of claim 7, further comprising:
   sending, by the network device, configuration information of the at least two MCS tables to the terminal device, the configuration information being used for determining the at least two MCS tables.

9. The method of claim 8, wherein
   a search space is further used by the terminal device to determine the target MCS table from the at least two MCS tables.

10. The method of claim 7, wherein the correspondence between the at least two MCS tables and the multiple RNTI types used for scrambling the DCIs is determined based on a protocol; or, determined based on a high-layer configuration.

11. A terminal device, comprising:
    at least one network interface, configured to receive Downlink Control Information (DCI) from a network side, wherein the DCI is scrambled by a Radio Network Temporary Identity (RNTI); and
    at least one processor, configured to determine a target Modulation and Coding Scheme (MCS) table from at least two MCS tables based on a type of the RNTI used for scrambling the DCI and a correspondence between the at least two MCS tables and multiple RNTI types used for scrambling DCIs.

12. The terminal device of claim 11, wherein the at least one network interface is further configured to:
    receive configuration information of the at least two MCS tables, the configuration information being used for determining the at least two MCS tables.

13. The terminal device of claim 11, wherein
    a search space is further used by the terminal device to determine the target MCS table from the at least two MCS tables.

14. The terminal device of claim 13, wherein the at least one processor is further configured to determine the correspondence between the at least two MCS tables and the multiple RNTI types used for scrambling the DCIs based on a protocol; or, determine the correspondence between the at least two MCS tables and the multiple RNTI types used for scrambling the DCIs based on a high-layer configuration.

15. The terminal device of claim 13, wherein a corresponding MCS table is configured for each RNTI type.

16. The terminal device of claim 15, wherein the at least one processor is configured to:
    determine the type of the RNTI for scrambling the DCI.

17. A network device, comprising:
    at least one network interface, configured to send Downlink Control Information (DCI) scrambled by a Radio Network Temporary Identity (RNTI) to a terminal device, to enable the terminal device to determine a target Modulation and Coding Scheme (MCS) table from at least two MCS tables based on a type of the RNTI used for scrambling the DCI and a correspondence between the at least two MCS tables and multiple RNTI types used for scrambling DCIs.

18. The network device of claim 17, wherein the at least one network interface is further configured to:
    send configuration information of the at least two MCS tables to the terminal device, the configuration information being used for determining the at least two MCS tables.

19. The network device of claim 17, wherein
a search space is further used by the terminal device to determine the target MCS table from the at least two MCS tables.

20. The network device of claim 19, further comprising:
at least one processor, configured to determine the correspondence between the at least two MCS tables and the multiple RNTI types used for scrambling the DCIs based on a protocol; or, determine the correspondence between the at least two MCS tables and the multiple RNTI types used for scrambling the DCIs based on a high-layer configuration.

* * * * *